United States Patent
Yin et al.

(10) Patent No.: US 10,964,337 B2
(45) Date of Patent: Mar. 30, 2021

(54) METHOD, DEVICE, AND STORAGE MEDIUM FOR EVALUATING SPEECH QUALITY

(71) Applicant: Iflytek Co., Ltd., Hefei (CN)

(72) Inventors: Bing Yin, Anhui (CN); Si Wei, Anhui (CN); Guoping Hu, Anhui (CN); Su Cheng, Anhui (CN)

(73) Assignee: Iflytek Co., Ltd., Hefei (CN)

( * ) Notice: Subject to any disclaimer, the term of this patent is extended or adjusted under 35 U.S.C. 154(b) by 158 days.

(21) Appl. No.: 16/280,705

(22) Filed: Feb. 20, 2019

(65) Prior Publication Data
US 2019/0180771 A1 Jun. 13, 2019

Related U.S. Application Data

(63) Continuation of application No. PCT/CN2016/111050, filed on Dec. 20, 2016.

(30) Foreign Application Priority Data

Oct. 12, 2016 (CN) .......................... 201610892176.1

(51) Int. Cl.
*G10L 25/60* (2013.01)
*G10L 15/22* (2006.01)
(Continued)

(52) U.S. Cl.
CPC ............ *G10L 25/60* (2013.01); *G10L 15/063* (2013.01); *G10L 15/22* (2013.01); *G10L 25/30* (2013.01)

(58) Field of Classification Search
USPC ................................. 704/200–232, 500–504
See application file for complete search history.

(56) References Cited

U.S. PATENT DOCUMENTS

| | | | |
|---|---|---|---|
| 7,327,985 B2 * | 2/2008 | Morfitt, III | G10L 25/48 455/67.11 |
| 7,366,663 B2 * | 4/2008 | Beerends | H04M 3/2236 455/135 |

(Continued)

FOREIGN PATENT DOCUMENTS

| CN | 104361894 A | 2/2015 |
|---|---|---|
| CN | 105282347 A | 1/2016 |

(Continued)

OTHER PUBLICATIONS

WO 2018/068396 A1 Search Report.
(Continued)

*Primary Examiner* — Jesse S Pullias
(74) *Attorney, Agent, or Firm* — Young Basile Hanlon & MacFarlane, P.C.

(57) ABSTRACT

A method, a device and a storage medium for evaluating speech quality include: receiving speech data to be evaluated; extracting evaluation features of the speech data to be evaluated; performing quality evaluation to the speech data to be evaluated according to the evaluation features of the speech data to be evaluated and a predetermined speech quality evaluation model, in which the speech quality evaluation model is an indication of a relationship between evaluation features of single-ended speech data and quality information of the single-ended speech data.

15 Claims, 3 Drawing Sheets

(51) Int. Cl.
*G10L 15/06* (2013.01)
*G10L 25/30* (2013.01)

(56) References Cited

U.S. PATENT DOCUMENTS

| | | | |
|---|---|---|---|
| 8,305,913 B2* | 11/2012 | El-Hennawey | H04L 65/80 370/252 |
| 8,560,312 B2* | 10/2013 | Etter | G10L 25/69 704/233 |
| 2003/0171922 A1* | 9/2003 | Beerends | G10L 19/00 704/233 |
| 2014/0032212 A1* | 1/2014 | Plapous | G10L 19/00 704/201 |
| 2014/0358526 A1 | 12/2014 | Abdelal et al. | |
| 2015/0348571 A1 | 12/2015 | Koshinaka et al. | |
| 2016/0210984 A1* | 7/2016 | Xiao | H04L 65/80 |

FOREIGN PATENT DOCUMENTS

| | | |
|---|---|---|
| JP | H11510334 A | 9/1999 |
| KR | 19990028694 A | 4/1999 |
| WO | 9705730 A1 | 2/1997 |

OTHER PUBLICATIONS

Extended European Search Report for European Application No. 16918904.0 dated Apr. 9, 2020.
Office Action for Japanese Application No. 2019-500365 dated Feb. 2, 2020.
Sep. 30, 2009 (Sep. 30, 2009), pp. 95-104, (Yin, Wei, Research on Speech Enhancement Based on Speech Modeling and Speech Quality Assessment, Dissertation Submitted to Wuhan University for the Doctoral Degree).
Korean Office Action and Translation for Korean Application No. 10-2019-7009232 dated Sep. 18, 2020.

* cited by examiner

METHOD, DEVICE, AND STORAGE MEDIUM FOR EVALUATING SPEECH QUALITY

CROSS-REFERENCE TO RELATED APPLICATION(S)

This application is a continuation of International Application No. PCT/CN2016/111050, filed on Dec. 20, 2016, which claims priority to Chinese Patent Application No. 201610892176.1, filed on Oct. 12, 2016, the contents of both of which are incorporated herein by reference in their entireties.

TECHNICAL FIELD

The present disclosure relates to communication technology field, and more particularly to a method for evaluating speech quality and a device for evaluating speech quality.

BACKGROUND

With the continuous development of technologies, the role of communication becomes more important in people's life, such as speech data transmission by communication network. Speech quality is an important factor for evaluating quality of the communication network. In order to evaluate the speech quality, it is necessary to develop an effective speech quality evaluation algorithm.

The speech quality evaluation in the communication network can be performed using, for example, Perceptual Evaluation of Speech Quality (PESQ) algorithm and Perceptual Objective Listening Quality Analysis (POLQA) algorithm. In order to implement these algorithms, input speech data and output speech data are often needed to be obtained. The input speech data is generally clean speech data and the output speech data is generally degraded speech data after passing the communication network. The output speech data may be evaluated by analyzing the input speech data and the output speech data. The input speech data is generally collected by road detection vehicles of operators. However, the input speech data cannot be obtained on the floors of residential area, malls or other indoor conditions because the road detection vehicles cannot collect in these conditions. Thus, speech quality evaluation cannot be performed according to the input speech data, and the mentioned algorithms based on the input speech data and output speech data to evaluate the speech quality of the output speech data have limitations in application.

SUMMARY

Implementations of a first aspect of the present disclosure provide a method for evaluating speech quality. The method includes: receiving speech data to be evaluated; extracting evaluation features of the speech data to be evaluated; and performing quality evaluation to the speech data to be evaluated according to the evaluation features of the speech data to be evaluated and a predetermined speech quality evaluation model, in which the speech quality evaluation model is an indication a relationship between evaluation features of single-ended speech data and quality information of the single-ended speech data.

Implementations of the present disclosure also provide a non-transitory computer-readable storage medium including instructions for evaluating speech quality, which instructions when executed by a processor become operational with the processor to: receive speech data to be evaluated; extract evaluation features of the speech data to be evaluated; and perform quality evaluation to the speech data to be evaluated according to the evaluation features of the speech data to be evaluated and a predetermined speech quality evaluation model, in which the speech quality evaluation model is an indication of a relationship between evaluation features of single-ended speech data and quality information of the single-ended speech data.

Implementations of the present disclosure also provide a device. The device includes one or more processors; and a memory storing one or more programs which when executed by the one or more processors become operational with the processor to: receive speech data to be evaluated; extract evaluation features of the speech data to be evaluated; and perform quality evaluation to the speech data to be evaluated according to the evaluation features of the speech data to be evaluated and a predetermined speech quality evaluation model, in which the speech quality evaluation model is an indication of a relationship between evaluation features of single-ended speech data and quality information of the single-ended speech data.

Additional aspects and advantages of implementations of the present disclosure will be given in part in the following descriptions, become apparent in part from the following descriptions, or be learned from the practice of the implementations of the present disclosure.

BRIEF DESCRIPTION OF THE DRAWINGS

These and other aspects and advantages of implementations of the present disclosure will become apparent and more readily appreciated from the following descriptions made with reference to the drawings, in which.

DETAILED DESCRIPTION

Reference will be made in detail to implementations of the present disclosure. Implementations of the present disclosure will be shown in drawings, in which the same or similar elements and the elements having same or similar functions are denoted by like reference numerals throughout the descriptions. The implementations described herein according to drawings are explanatory and illustrative, not construed to limit the present disclosure. On the contrary, implementations of the present disclosure include all the changes, alternatives, and modifications falling into the scope of the spirit and principles of the attached claims.

In order to solve the problem in the PESQ algorithm and to adapt a demand of speech quality evaluation in 4G/LTE era, ITU-T (International Telecommunication Union-Telecommunication Sector) began development work of the POLQA algorithm in 2006, which was officially issued as ITU-T P.863 standard in early 2011. Main features of the standard are to cover the latest speech coding and network transmission technology. It has higher accuracy and high quality to support ultra-wideband (50 Hz-14 KHz) speech transmission in 3G, 4G/LTE and VoIP (Voice over Internet Phone) network. Therefore, the POLQA algorithm is a commonly algorithm selected to evaluate speech quality of communication network at present.

Deep Learning originates from Artificial Neural Network. A multi-layer perceptron with a plurality of hidden layers is a structure of the Deep Learning. The Deep Learning forms more abstract high layers to indicate attribute types or features by combining low layer features, so as to find representation of distributed features of data. For example, application fields of the Deep Learning can include computer vision, acoustic model training of speech recognition, machine translation, semantic mining and other natural language processing fields.

As Deep Learning is still developing continuously, it is an objective of the present disclosure to use it in communication field, especially in speech quality evaluation of the communication field.

For example, POLQA algorithm can be used for completing speech quality evaluation. However, the inventor finds out that the POLQA algorithm needs two-ended speech data, that is, when evaluating speech quality of the output speech data, it not only needs output speech data but also input speech data. Because it is difficult to obtain input speech data in some cases, the application of the POLQA algorithm is limited. In order to prevent the problem of application limitation, it is necessary to provide new solutions. By further analysis, the inventor finds out that models predetermined by the Deep Learning have excellent performance, so the Deep Learning may be introduced into speech quality evaluation algorithms. Furthermore, to prevent the problem of application limitation by adopting two-ended speech data, single-ended speech data may only be used as a sample for training when models are predetermined by the Deep Learning. Thus, only speech data to be evaluated is necessary as a single-ended when evaluating speech quality with a predetermined model.

Therefore, an objective of the present disclosure is to introduce the Deep Learning into the speech quality evaluation, especially into the speech quality evaluation in communication field. By providing a new solution only relying on single-ended speech data for the speech quality evaluation in communication field, and by determining models via the Deep Learning when relying on the single-ended speech data only, excellent performance of the models may be ensured. Thus, the technical problems of the speech quality evaluation are solved with less limitation but better performance. Furthermore, it should be noted that, specific technical solutions are not limited to the implementations disclosed herein. The features described below may be combined with other features, and these combinations still belong to the scope of the present disclosure.

Furthermore, it should be noted that, although some technical problems solved by the present disclosure have been given above, the present disclosure is not limited to solving the technical problems above. Other problems solved by the present disclosure still belong to the scope of the present disclosure.

Furthermore, it should be noted that, although the main ideas of the present disclosure have been given above, and some special points will be illustrated in subsequent implementations, innovative points of the present disclosure are not limited to the content involved in the main ideas above and the special points. It does not eliminate that some contents of the present disclosure not specially illustrated may still include innovative points of the present disclosure.

It should be understood that, although some technical solutions are described, some other possible technical solutions are not eliminated. Therefore, the technical solutions given by same, similar, equal or other cases of implementations of the present disclosure still belong to the scope of the present disclosure.

The technical solutions of the present disclosure will be illustrated with reference to specific implementations as follows.

Figure 1:
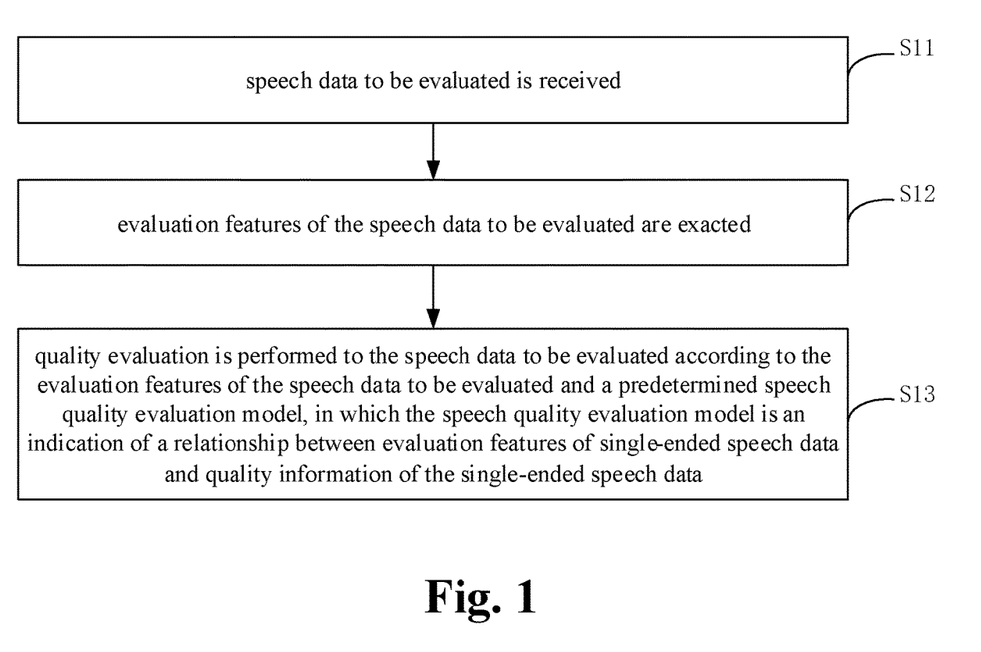
FIG. 1 is a flow chart of a method for evaluating speech quality according to an implementation of the present disclosure.

FIG. 1 is a flow chart of a method for evaluating speech quality according to an implementation of the present disclosure.

As shown in FIG. 1, the method in the implementation includes followings.

At S11, speech data to be evaluated is received.

Taking the communication field as an example, the speech data to be evaluated may specifically refer to output speech data of the communication network, i.e. degraded speech data after input speech data passes the communication network. The input speech data generally refers to clean speech data or original speech data, and the degreed speech data generally refers to speech data with quality degradation (such as one or more terms of degradation of clarity, delay, noise etc.) with respect to the original speech data.

At S12, evaluation features of the speech data to be evaluated are extracted.

The evaluation features of the speech data to be evaluated are the same with evaluation features extracted from degreed speech data when a speech quality evaluation model is predetermined, which may be determined according to application demands.

In general, the evaluation features refer to features describing the speech data from a perspective of human auditory perception, which may refer to subsequent description.

At S13, quality evaluation is performed to the speech data to be evaluated according to the evaluation features of the speech data to be evaluated and a predetermined speech quality evaluation model, in which the speech quality evaluation model is an indication of a relationship between evaluation features of single-ended speech data and quality information of the single-ended speech data.

The speech quality evaluation model may be predetermined before the speech quality evaluation is required. For example, the speech quality evaluation model may be predetermined offline, thus the speech quality evaluation model may be used directly when the speech quality evaluation is required. Certainly, it is not eliminated that the speech quality evaluation model is predetermined online, such as predetermined online when the speech quality evaluation is required. Specific determining process of the speech quality evaluation model may refer to subsequent description.

Input and output of the speech quality evaluation model are evaluation features and quality information of the single-ended speech data respectively. Therefore, after extracting the evaluation features of the speech data to be evaluated, the evaluation features of the speech data to be evaluated may be taken as the input of the speech quality evaluation model, thus the output obtained from the speech quality evaluation model is the quality information of the speech data to be evaluated, and then the speech quality evaluation is realized.

Furthermore, the speech quality evaluation model may be described by a regression model or by a classification model. The quality information mentioned above may be different when the speech quality evaluation model is described in different cases. For instance, if the speech quality evaluation model is described by the regression model, the quality information obtained is a specific evaluation score, such as a score among 1-5. If the speech quality evaluation model is described by the classification model, the quality information obtained is an evaluation classification, such as a classification among worse, bad, common, good and better.

Furthermore, in some implementations, in order to improve accuracy of the speech quality evaluation, normalization may be performed to a result of the speech quality evaluation obtained in S13. Taking the result of the quality evaluation being the evaluation score as an example, the evaluation score obtained in S13 may be taken as a final evaluation score directly in the normalization, alternatively, the evaluation score obtained in S13 may be normalized according to packet loss, jitter, delay and other related parameters of the communication network to obtain the final evaluation score. Algorithm for normalizing according to the parameters of communication network may be set, which is not described in detail herein. For instance, the evaluation score obtained in S13 may be multiplied by a coefficient as the final evaluation score, in which the coefficient is related to the above parameters of the communication network.

In the implementation, by performing the quality evaluation to the speech data to be evaluated via the speech quality evaluation model, it only needs the single-ended speech data for speech quality evaluation, and it can prevent a problem of limitation in applications caused by relying on two-ended speech data, thus expanding the scope of applications.

Figure 2:
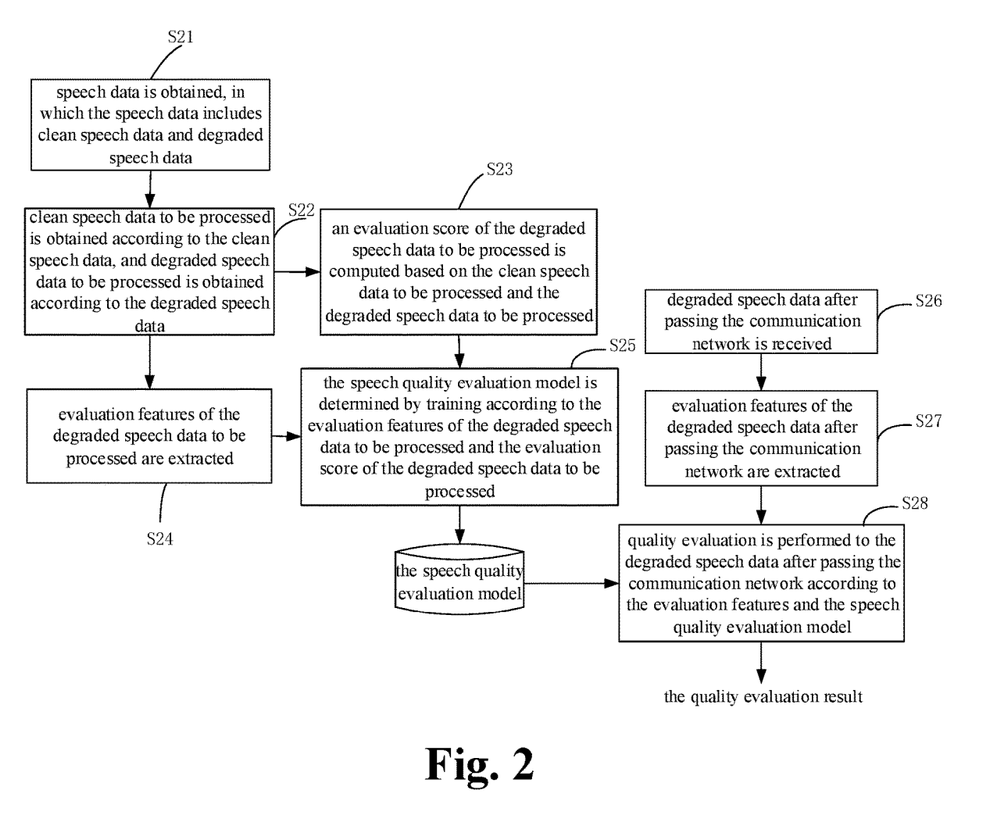
FIG. 2 is a flow chart of a method for evaluating speech quality according to another implementation of the present disclosure.

FIG. 2 is a flow chart of a method for evaluating speech quality according to another implementation of the present disclosure.

In this implementation, the degraded speech data after passing the communication network is taken as an example of the speech data to be evaluated. Determining by the Deep Learning is taken as an example for determining the speech quality evaluation model.

As shown in FIG. 2, the method in the implementation includes followings.

At S21, speech data is obtained, in which the speech data includes clean speech data and degraded speech data.

The speech data may be obtained by at least one way of collecting and obtaining directly from existing data. In order to improve accuracy of the determined speech quality evaluation model, as much speech data as possible should be obtained here.

The way of collecting, for instance, when collecting the speech data, the clean speech data and the degraded speech data after passing the communication network may be obtained respectively by simulating the communication. Specifically, a large amount of clean speech data is collected from a high fidelity studio firstly, such as 2000 hours of clean speech data. Then by using multiple mobile phones to simulate calls, that is, one mobile phone is used to make a call to play the clean speech data, and the other mobile phone is used to receive the clean speech data, the degraded speech data after passing the communication network is obtained by restoring transmitted data packets at different interfaces of the communication network.

Certainly, the clean speech data and the degraded speech data may be obtained respectively by collecting speech data from real network calls directly, method of which is not limited in the present disclosure.

Furthermore, the clean speech data and the degraded speech data may be collected separately when collecting the speech data, thus the clean speech data and the degraded speech data may directly be obtained respectively. Alternatively, the clean speech data and the degraded speech data may be collected together while marked respectively to distinguish the clean speech data form the degraded speech data when collecting the speech data. For instance, a marker 1 may be used to represent the clean speech data, and a marker 0 may be used to represent the degraded speech data, the clean speech data and the degraded speech data may be obtained according to the markers.

At S22, clean speech data to be processed is obtained according to the clean speech data, and degraded speech data to be processed is obtained according to the degraded speech data.

S22 may include at least one of:

using the degraded speech data as the degraded speech data to be processed;

extracting valid speech segments from the degraded speech data, and using the valid speech segments of the degraded speech data as the degraded speech data to be processed;

clustering the degraded speech data, and using degraded speech data corresponding to first cluster centers as the degraded speech data to be processed; and extracting valid speech segments from the degraded speech data, clustering the valid speech segments of the degraded speech data, and using valid speech segments corresponding to second cluster centers as the degraded speech data to be processed.

Specifically, after obtaining the clean speech data and the degraded speech data, the clean speech data obtained and the degraded speech data obtained may be directly taken as the clean speech data to be processed and the degraded speech data to be processed respectively. Furthermore, after obtaining the clean speech data and the degraded speech data, valid speech segments may be extracted for the clean speech data and the degraded speech data respectively. The valid speech segments of the clean speech data are taken as the clean speech data to be processed, and the valid speech segments of the degraded speech data are taken as the degraded speech data to be processed. Specific ways for extracting the valid speech segments are not limited, for instance, the way of Voice Activity Detection (VAD). By processing the valid speech segments only, computation and complexity may be reduced.

Furthermore, when obtaining the degraded speech data to be processed, all the degraded speech data included in the speech data or all the valid speech segments of the degraded speech data may be taken as the degraded speech data to be processed. Alternatively, part of the degraded speech data or its valid speech segments may be selected as the degraded speech data to be processed. When selecting, cluster method may be used, in which all the degraded speech data or its valid speech segments may be clustered to obtain cluster centers, and the degraded speech data or the valid speech segments corresponding to the cluster centers are taken as the degraded speech data to be processed.

For instance, when clustering, ivector features of the valid speech segments of the degraded speech data are extracted. The ivector features extracted are clustered by k-means method to obtain k cluster centers. The degraded speech data or the valid speech segments corresponding to each of the k cluster centers are taken as the degraded speech date to be processed. By clustering and by selecting the degraded speech data corresponding to the cluster centers to process, computation may be reduced and computation efficiency may be improved.

At S23, an evaluation score of the degraded speech data to be processed is computed based on the clean speech data to be processed and the degraded speech data to be processed.

The valid speech segments being the data to be processed, for instance, after obtaining the valid speech segments of the clean speech data and the valid speech segment of the degraded speech data, each valid speech segment of the degraded speech data is analyzed frame-by-frame according to the valid speech segments of the clean speech data to compute the evaluation score of the valid speech segments of the degraded speech data. The method for computing the evaluation score is not limited, for instance, the evaluation score may be a mean opinion score (MOS) of the speech data, specific computing method of which may be the same with that in the related art. For instance, the evaluation score may be obtained by the POLQA algorithm or the PESQ algorithm, which are not described in detail herein.

At S24, evaluation features of the degraded speech data to be processed are extracted.

The evaluation features describe the speech data from the perspective of human auditory perception. Specifically, time domain features of the degraded speech data to be processed are extracted firstly, such as short-time average energy of the speech data, segmented background noise of the speech data, short time wave shock or shake of the speech data, fundamental frequency features and difference features of the fundamental frequency (such as, first or second order difference value of the fundamental frequency), etc. Then spectral features of the degraded speech data to be processed are obtained. The spectral features of the degraded speech data to be processed are extracted, such as FilterBank features and linear predictive coding (LPC) features, etc. A filter with cochlear shape which can describe the speech data from the perspective of human auditory perception is used to extract the spectral features, thus the spectral features extracted can describe the speech data from the perspective of human auditory perception. In order to describe the degraded speech data to be processed better, mean value, variance, maximum value, minimum value and difference features (such as, first or second order difference), etc., of each spectral feature may be extracted. Which evaluation feature to be extracted may be determined according to application demands and degraded case of the speech data, which is not limited in the present disclosure.

At S25, the speech quality evaluation model is determined by training according to the evaluation features of the degraded speech data to be processed and the evaluation score of the degraded speech data to be processed.

The Deep Learning technique is used for training to obtain the parameters of the speech quality evaluation model, thus the speech quality evaluation model is determined.

Network topology used by the Deep Learning method may be a combination of one or more of Deep Neural Networks (DNN), Convolutional Neural Networks (CNN), Recurrent Neural Networks (RNN), Long Short-Term Memory (LSTM) Neural Networks or other Neural Networks, which is not specifically limited in the present disclosure. The selection of the networks may be determined by application demands. Training process after obtaining the input and output of the model is the same with that in the related art, which is not described in detail herein.

Furthermore, the speech quality evaluation model may be described by different types of models, such as the regression model or the classification model. The input and output corresponding to the speech quality evaluation model may be adjusted accordingly when the speech quality evaluation model is described by different types of models.

In detail, based on a determination that the speech quality evaluation model includes a regression model, the obtained evaluation features of the degraded speech data to be processed are used as inputs of the speech quality evaluation model and the evaluation score of the degraded speech data to be processed is used as an output of the speech quality evaluation model.

Based on a determination that the speech quality evaluation model includes a classification model, the obtained evaluation features of the degraded speech data to be processed are used as inputs of the speech quality evaluation model, and the evaluation score of the degraded speech data to be processed is quantized to obtain evaluation classifications, and the evaluation classifications are used as outputs of the speech quality evaluation model.

Specifically, when quantizing the evaluation score, a fixed step or an unfixed step may be used to quantize the evaluation score of the degraded speech data to be processed. For instance, if the fixed step is used, the evaluation scores of all the degraded speech data to be processed are quantized by the fixed step being 0.2 to obtain classification of each degraded speech data to be processed. Taking a MOS score as an example, when quantizing with a step of 0.2, 20 evaluation classifications may be obtained by quantizing scores of 1-5. If the unfixed step is used, a quantization step of the evaluation score in each scope of the degraded speech data to be processed may be determined according to application demands. For instance, a large step may be used to quantize for a scope with lower evaluation score, a small step may be used to quantize for a scope with higher evaluation score. Taking the MOS score as an example, a large step, 0.5 for instance, may be used to quantize as the score scope from 1 to 3 is a scope with lower score, a small step, 0.2 for instance, may be used to quantize as the score scope from 3 to 5 is a scope with higher score, and a total of 14 evaluation classifications may be obtained after quantizing.

Certainly, other method may also be used to quantize the evaluation score to divide the evaluation score into a plurality of evaluation classifications, such as the classification among worse, bad, common, good and better, which is not limited in the present disclosure.

At S26, degraded speech data after passing the communication network is received.

At S27, evaluation features of the degraded speech data after passing the communication network are extracted.

The method for extracting the evaluation features of the degraded speech data after passing the communication network is the same as that in the training process, which is not described in detail herein.

At S28, quality evaluation is performed to the degraded speech data after passing the communication network according to the evaluation features and the speech quality evaluation model.

Specifically, the evaluation features of the current degraded speech data are taken as the input of the speech quality evaluation model, and the output of the speech quality evaluation model is taken as a quality evaluation result of the current degraded speech data. If the speech quality evaluation model is described by the regression model, the quality evaluation result will be the evaluation score. If the speech quality evaluation model is described by the classification model, the quality evaluation result will be the evaluation classification.

In the implementation, by performing the quality evaluation to the speech data to be evaluated via the speech quality evaluation model, it only needs the single-ended speech data for speech quality evaluation, and it can prevent a problem of limitation in applications caused by relying on two-ended speech data, thus expanding the scope of applications. Furthermore, by training with the Deep Leaning method, excellent performance of the Deep Leaning method may be used thereby making the speech quality evaluation model more accurate, thus, the speech quality evaluation results are more accurate. Furthermore, by performing the quality evaluation to speech data in the communication field, the Deep Learning may be combined with the speech quality evaluation in the communication field, and new solutions for speech quality evaluation in the communication field is provided.

Figure 3:
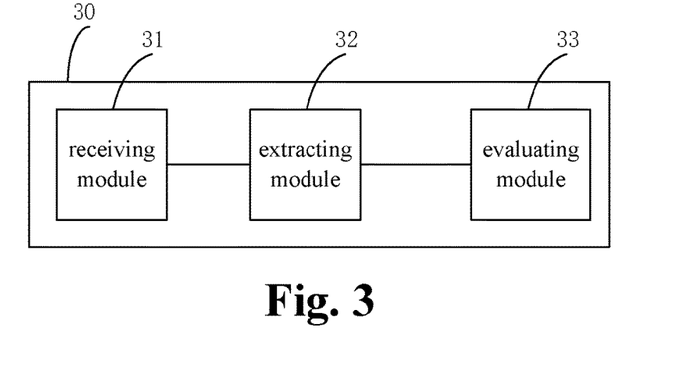
FIG. 3 is a schematic diagram of a device for evaluating speech quality according to an implementation of the present disclosure.

FIG. 3 is a schematic diagram of a device for evaluating speech quality according to an implementation of the present disclosure.

As shown in FIG. 3, the device 30 according to the implementation includes a receiving module 31, an extracting module 32 and an evaluating module 33.

The receiving module 31 is configured to receive speech data to be evaluated.

The extracting module 32 is configured to extract evaluation features of the speech data to be evaluated.

The evaluating module 33 is configured to perform quality evaluation to the speech data to be evaluated according to the evaluation features of the speech data to be evaluated and a built speech quality evaluation model, in which the speech quality evaluation model is configured to indicate a relationship between evaluation features of single-ended speech data and quality information of the single-ended speech data.

In some implementations, the speech data to be evaluated includes degraded speech data after passing communication network.

Figure 4:
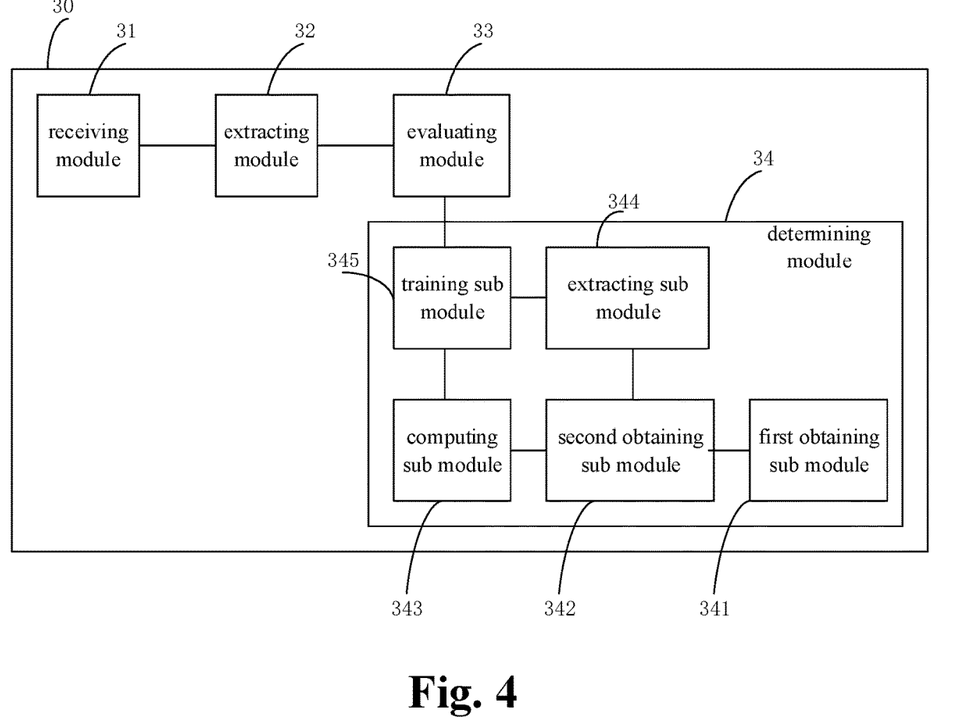
FIG. 4 is a schematic diagram of a device for evaluating speech quality according to another implementation of the present disclosure.

In some implementations, as shown in FIG. 4, the device 30 according to the implementation further includes a building module 34, which is configured to build the speech quality evaluation model. The building module 34 includes the following.

A first obtaining sub module 341 configured to obtain speech data, in which the speech data includes clean speech data and degraded speech data;

A second obtaining sub module 342 is configured to obtain clean speech data to be processed according to the clean speech data, and to obtain degraded speech data to be processed according to the degraded speech data.

A computing sub module 343 is configured to compute an evaluation score of the degraded speech data to be processed according to the clean speech data to be processed and the degraded speech data to be processed.

An extracting sub module 344 is configured to extract evaluation features of the degraded speech data to be processed.

A training sub module 345 is configured to build the speech quality evaluation model by training according to the evaluation features of the degraded speech data to be processed and the evaluation score of the degraded speech data to be processed.

In some implementations, the speech quality evaluation model is built by training with Deep Learning.

In some implementations, the training sub module 345 is further configured to: if the speech quality evaluation model is described by a regression model, take the evaluation features of the degraded speech data to be processed and the evaluation score of the degraded speech data to be processed as model inputs and model output respectively, train model parameters, and build the speech quality evaluation model; if the speech quality evaluation model is described by a classification model, take the evaluation features of the degraded speech data to be processed as model inputs, quantize the evaluation score of the degraded speech data to be processed to obtain evaluation classifications, take the evaluation classifications as model outputs, train model parameters, and build the speech quality evaluation model.

In some implementations, the second obtaining sub module 342 is configured to obtain clean speech data to be processed according to the clean speech data, by acts of: taking the clean speech data as the clean speech data to be processed directly; or extracting valid speech segments of the clean speech data, and taking the valid speech segments of the clean speech data as the clean speech data to be processed.

In some implementations, the second obtaining sub module 342 is configured to obtain degraded speech data to be processed according to the degraded speech data, by acts of: taking the degraded speech data as the degraded speech data to be processed directly; or extracting valid speech segments of the degraded speech data, and taking the valid speech segments of the degraded speech data as the degraded speech data to be processed; or clustering the degraded speech data, and taking degraded speech data corresponding to first cluster centers as the degraded speech data to be processed; or extracting valid speech segments of the degraded speech data, clustering the valid speech segments of the degraded speech data, and taking valid speech segments corresponding to second cluster centers as the degraded speech data to be processed.

It should be understood that the device according to the implementation corresponds to the method implementations above, and the details thereof can be referred to the description of the method implementations, which is not described in detail herein.

In the implementation, by performing the quality evaluation to the speech data to be evaluated via the speech quality evaluation model, it only needs the single-ended speech data for speech quality evaluation, and it can prevent a problem of limitation in applications caused by relying on two-ended speech data, thus expanding the scope of applications.

Implementations of the present disclosure also provide a device. The device includes: one or more processors; and a memory configured to store one or more programs. When the one or more programs are executed by the one or more processors, the one or more processors are caused to perform the method including: receiving speech data to be evaluated; extracting evaluation features of the speech data to be evaluated; and performing quality evaluation to the speech data to be evaluated according to the evaluation features of the speech data to be evaluated and a built speech quality evaluation model, in which the speech quality evaluation model is configured to indicate a relationship between evaluation features of single-ended speech data and quality information of the single-ended speech data.

Implementations of the present disclosure also provide a non-transitory computer-readable storage medium having stored therein one or more programs that, when executed by one or more processors, causes the one or more processors to perform the method including: receiving speech data to be evaluated; extracting evaluation features of the speech data to be evaluated; and performing quality evaluation to the speech data to be evaluated according to the evaluation features of the speech data to be evaluated and a built speech quality evaluation model, in which the speech quality evaluation model is configured to indicate a relationship between evaluation features of single-ended speech data and quality information of the single-ended speech data.

Implementations of the present disclosure also provide a computer program product. When the computer program product is executed by one or more processors of a device, the one or more processors are caused to perform the method including: receiving speech data to be evaluated; extracting evaluation features of the speech data to be evaluated; and performing quality evaluation to the speech data to be evaluated according to the evaluation features of the speech data to be evaluated and a built speech quality evaluation model, in which the speech quality evaluation model is configured to indicate a relationship between evaluation features of single-ended speech data and quality information of the single-ended speech data.

It should be understood that the same or similar parts in the above implementations may refer to each other, and the contents not described in detail in some implementations may refer to the same or similar contents in other implementations.

It is to be noted that, in the description of the present disclosure, terms of "first" and "second" are only used for description and cannot be seen as indicating or implying relative importance. Furthermore, in the description of the present disclosure, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous implementations of the present disclosure comprise other implementations in which the order of execution is different from that which is depicted or discussed, including executing functions in a substantially simultaneous manner or in an opposite order according to the related functions. This should be understood by those skilled in the art which implementations of the present disclosure belong to.

It should be understood that each part of the present disclosure may be realized by the hardware, software, firmware or their combination. In the above implementations, a plurality of steps or methods may be realized by the software or firmware stored in the memory and executed by the appropriate instruction execution system. For example, if it is realized by the hardware, likewise in another implementation, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method implementations of the present disclosure when run on a computer.

In addition, each function cell of the implementations of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The above-mentioned memory medium may be a read-only memory, a magnetic disc, or an optical disc, etc.

Reference throughout this specification to "an implementation," "some implementations," "an example," "a specific example," or "some examples," means that a particular feature, structure, material, or characteristic described in connection with the implementation or example is included in at least one implementation or example of the present disclosure. The appearances of the phrases throughout this specification are not necessarily referring to the same implementation or example of the present disclosure. Furthermore, the particular features, structures, materials, or characteristics may be combined in any suitable manner in one or more implementations or examples.

Although explanatory implementations have been shown and described, it would be appreciated by those skilled in the art that the above implementations cannot be construed to limit the present disclosure, and changes, alternatives, and modifications can be made in the implementations without departing from spirit, principles and scope of the present disclosure.

What is claimed is:

1. A method for evaluating speech quality, comprising:
receiving speech data to be evaluated;
extracting evaluation features of the speech data to be evaluated; and
performing, by a processor, quality evaluation to the speech data to be evaluated according to the evaluation features of the speech data to be evaluated and a predetermined speech quality evaluation model, wherein the speech quality evaluation model is an indication of a relationship between evaluation features of single-ended speech data and quality information of the single-ended speech data,
wherein the speech quality evaluation model is obtained by actions of:
obtaining speech data, wherein the speech data comprises clean speech data and degraded speech data;
obtaining clean speech data to be processed according to the clean speech data, and obtaining degraded speech data to be processed according to the degraded speech data;
computing an evaluation score of the degraded speech data to be processed based on the clean speech data to be processed and the degraded speech data to be processed;
extracting evaluation features of the degraded speech data to be processed; and
determining the speech quality evaluation model by training according to the evaluation features of the degraded speech data to be processed and the evaluation score of the degraded speech data to be processed,
wherein obtaining the degraded speech data to be processed according to the degraded speech data comprises one of:
clustering the degraded speech data, and using degraded speech data corresponding to first cluster centers as the degraded speech data to be processed; or extracting valid speech segments from the degraded speech data, clustering the valid speech segments of the degraded speech data, and using valid speech segments corresponding to second cluster centers as the degraded speech data to be processed.

2. The method of claim 1, wherein the speech data to be evaluated comprises first degraded speech data after passing a communication network.

3. The method of claim 1, wherein the speech quality evaluation model is determined by training using a Deep Learning technique.

4. The method of claim 3, wherein determining the speech quality evaluation model by training according to the evaluation features of the degraded speech data to be processed and the evaluation score of the degraded speech data to be processed comprises one of:
based on a determination that the speech quality evaluation model comprises a regression model:
using the evaluation features of the degraded speech data to be processed as inputs of the speech quality evaluation model and the evaluation score of the degraded speech data to be processed as an output of the speech quality evaluation model,
training parameters of the speech quality evaluation model, and
determining the speech quality evaluation model; and
based on a determination that the speech quality evaluation model comprises a classification model:
using the evaluation features of the degraded speech data to be processed as inputs of the speech quality evaluation model,
quantizing the evaluation score of the degraded speech data to be processed to obtain evaluation classifications,
using the evaluation classifications as outputs of the speech quality evaluation model,
training the parameters of the speech quality evaluation model, and
determining the speech quality evaluation model.

5. The method of claim 1, wherein obtaining the clean speech data to be processed according to the clean speech data comprises one of:
using the clean speech data as the clean speech data to be processed; or
extracting valid speech segments from the clean speech data, and using the valid speech segments of the clean speech data as the clean speech data to be processed.

6. A non-transitory computer-readable storage medium, comprising instructions for evaluating speech quality, which instructions when executed by a processor become operational with the processor to:
receive speech data to be evaluated;
extract evaluation features of the speech data to be evaluated; and
perform quality evaluation to the speech data to be evaluated according to the evaluation features of the speech data to be evaluated and a predetermined speech quality evaluation model, wherein the speech quality evaluation model is an indication of a relationship between evaluation features of single-ended speech data and quality information of the single-ended speech data;
wherein the speech quality evaluation model is obtained by actions of:
obtaining speech data, wherein the speech data comprises clean speech data and degraded speech data;
obtaining clean speech data to be processed according to the clean speech data, and obtaining degraded speech data to be processed according to the degraded speech data;
computing an evaluation score of the degraded speech data to be processed based on the clean speech data to be processed and the degraded speech data to be processed;
extracting evaluation features of the degraded speech data to be processed; and
determining the speech quality evaluation model by training according to the evaluation features of the degraded speech data to be processed and the evaluation score of the degraded speech data to be processed,
wherein obtaining the degraded speech data to be processed according to the degraded speech data comprises one of:
clustering the degraded speech data, and using degraded speech data corresponding to first cluster centers as the degraded speech data to be processed; or
extracting valid speech segments from the degraded speech data, clustering the valid speech segments of the degraded speech data, and using valid speech segments corresponding to second cluster centers as the degraded speech data to be processed.

7. The non-transitory computer-readable storage medium of claim 6, wherein the speech data to be evaluated comprises first degraded speech data after passing a communication network.

8. The non-transitory computer-readable storage medium of claim 6, wherein the speech quality evaluation model is determined by training using a Deep Learning technique.

9. The non-transitory computer-readable storage medium of claim 8, wherein the instructions operational with the processor to determine the speech quality evaluation model by training according to the evaluation features of the degraded speech data to be processed and the evaluation score of the degraded speech data to be processed further comprise instructions which when executed by the processor become operational with the processor to:
based on a determination that the speech quality evaluation model comprises a regression model:
use the evaluation features of the degraded speech data to be processed as inputs of the speech quality evaluation model and the evaluation score of the degraded speech data to be processed as an output of the speech quality evaluation model,
train parameters of the speech quality evaluation model, and
determine the speech quality evaluation model; or
based on a determination that the speech quality evaluation model comprises a classification model:
use the evaluation features of the degraded speech data to be processed as inputs of the speech quality evaluation model,
quantize the evaluation score of the degraded speech data to be processed to obtain evaluation classifications,
use the evaluation classifications as outputs of the speech quality evaluation model,
train parameters of the speech quality evaluation model, and
determine the speech quality evaluation model.

10. The non-transitory computer-readable storage medium of claim 6, wherein the instructions operational with the processor to obtain the clean speech data to be processed according to the clean speech data further comprise instructions which when executed by the processor become operational with the processor to:
use the clean speech data as the clean speech data to be processed; or
extract valid speech segments from the clean speech data, and use the valid speech segments of the clean speech data as the clean speech data to be processed.

11. A device, comprising:
one or more processors; and
a memory storing one or more programs which when executed by the one or more processors become operational with the one or more processors to:
receive speech data to be evaluated;
extract evaluation features of the speech data to be evaluated; and
perform quality evaluation to the speech data to be evaluated according to the evaluation features of the speech data to be evaluated and a predetermined speech quality evaluation model, wherein the speech quality evaluation model is an indication of a relationship between evaluation features of single-ended speech data and quality information of the single-ended speech data,
wherein the speech quality evaluation model is obtained by actions of:
obtaining speech data, wherein the speech data comprises clean speech data and degraded speech data;
obtaining clean speech data to be processed according to the clean speech data, and obtaining degraded speech data to be processed according to the degraded speech data;
computing an evaluation score of the degraded speech data to be processed based on the clean speech data to be processed and the degraded speech data to be processed;
extracting evaluation features of the degraded speech data to be processed; and
determining the speech quality evaluation model by training according to the evaluation features of the degraded speech data to be processed and the evaluation score of the degraded speech data to be processed,
wherein obtaining the degraded speech data to be processed according to the degraded speech data comprises one of:
clustering the degraded speech data, and using degraded speech data corresponding to first cluster centers as the degraded speech data to be processed; or
extracting valid speech segments from the degraded speech data, clustering the valid speech segments of the degraded speech data, and using valid speech segments corresponding to second cluster centers as the degraded speech data to be processed.

12. The device of claim 11, wherein the speech data to be evaluated comprises first degraded speech data after passing a communication network.

13. The device of claim 11, wherein the speech quality evaluation model is determined by training using a Deep Learning technique,
wherein the memory storing the one or more programs operational with the one or more processors to determine the speech quality evaluation model by training according to the evaluation features of the degraded speech data to be processed and the evaluation score of the degraded speech data to be processed further comprises one or more programs which when executed by the one or more processors become operational with the one or more processors to:
based on a determination that the speech quality evaluation model comprises a regression model:
use the evaluation features of the degraded speech data to be processed as inputs of the speech quality evaluation model and the evaluation score of the degraded speech data to be processed as an output of the speech quality evaluation model,
train parameters of the speech quality evaluation model, and
determine the speech quality evaluation model; or
based on a determination that the speech quality evaluation model comprises a classification model:
use the evaluation features of the degraded speech data to be processed as inputs of the speech quality evaluation model,
quantize the evaluation score of the degraded speech data to be processed to obtain evaluation classifications,
use the evaluation classifications as outputs of the speech quality evaluation model,
train parameters of the speech quality evaluation model, and
determine the speech quality evaluation model.

14. The device of claim 13, wherein the memory storing the one or more programs operational with the one or more processors to quantize the evaluation score of the degraded speech data to be processed to obtain evaluation classifications further comprises one or more programs which when executed by the one or more processors become operational with the one or more processors to:
quantize, using a fixed step value, the evaluation score of the degraded speech data to be processed to obtain evaluation classifications; or
quantize, using unfixed step values, the evaluation score of the degraded speech data to be processed to obtain evaluation classifications, wherein the unfixed step values are determined for scopes of the evaluation scores based on application demands.

15. The device of claim 11, wherein the memory storing the one or more programs operational with the one or more processors to obtain the clean speech data to be processed according to the clean speech data further comprises one or more programs which when executed by the one or more processors become operational with the one or more processors to:
use the clean speech data as the clean speech data to be processed; or
extract valid speech segments from the clean speech data, and use the valid speech segments of the clean speech data as the clean speech data to be processed.

* * * * *